United States Patent [19]

Norton

[11] Patent Number: 4,950,017
[45] Date of Patent: Aug. 21, 1990

[54] KIT WHICH PROVIDES A REMOVABLE TOP ASSEMBLY FOR ALL-TERRAIN VEHICLES AND THE LIKE, AND THE ASSEMBLED TOP THEREOF

[75] Inventor: Don S. Norton, Clinton, Miss.
[73] Assignee: Brell Mar Products, Inc., Jackson, Miss.
[21] Appl. No.: 317,982
[22] Filed: Mar. 2, 1989
[51] Int. Cl.⁵ .............................................. B60J 1/04
[52] U.S. Cl. .................................... 296/77.1; 296/102
[58] Field of Search .................. 296/77.1, 79, 80, 102; 135/88

[56] References Cited

U.S. PATENT DOCUMENTS

| | | | |
|---|---|---|---|
| 2,460,399 | 2/1949 | Schassberger | 296/77.1 |
| 2,682,427 | 6/1954 | Bright | 296/77.1 |
| 4,488,750 | 12/1984 | Garber | 296/77.1 |
| 4,621,859 | 11/1986 | Spicher | 296/77.1 |
| 4,778,214 | 10/1988 | Fu | 296/102 |
| 4,819,979 | 4/1989 | Moglia | 296/77.1 |

Primary Examiner—Robert R. Song
Attorney, Agent, or Firm—Nixon & Vanderhye

[57] ABSTRACT

A kit which provides a removable top assembly for a vehicle (e.g., all-terrain vehicles) includes a pair of lateral upright supports adapted to being rigidly fixed to a rear portion of the vehicle, forward and rearward generally U-shaped upright support bows adapted to being removably coupled to the lateral supports, and a forwardly extending, generally horizontal support bow adapted to being removably coupled to an upper region of the forward upright support bow. A fabric top component is connected at its forward edge to the horizontal support bow and at its rearward edge to the rearward upright support bow, the forward support bow serving to support the fabric along a region between its forward and rearward edges. When the top assembly is erected, the forward and rearward upright support bows will be inwardly flexed relative to one another so as to exert a tension force upon the fabric top component (i.e., due to the tendency of the upright support bows to separate from one another) to thereby maintain the same in a taunt condition.

29 Claims, 5 Drawing Sheets

KIT WHICH PROVIDES A REMOVABLE TOP ASSEMBLY FOR ALL-TERRAIN VEHICLES AND THE LIKE, AND THE ASSEMBLED TOP THEREOF

FIELD OF THE INVENTION

This invention is related to the field of removable top assemblies (sometimes called "convertible tops") for vehicles. More specifically, the invention relates to removable top assemblies which are especially adapted for use with so-called all-terrain vehicles (ATV's). The invention is preferably embodied in kit form having individual components which may be installed onto, and removed from, the ATV.

BACKGROUND AND SUMMARY OF THE INVENTION

All-terrain vehicles have recently become popular with sports enthusiasts as a means of traversing a variety of terrain (i.e., so-called "off-road" conditions). Particularly, hunters and outdoorsmen have found ATV's to be especially well suited to carry them between a base camp and remote hunting sites. While ATV's are useful to enable such persons to traverse a variety of terrain, they are not equipped for all-weather conditions—i.e., since a weather-protective top cover is not present. The absence of such a top cover is probably due to the ATV's lack of a front windscreen and its associated fame which provides necessary front support for most conventional convertible tops.

It would therefore be desirable if conventional ATV's could easily be retro-fitted (or supplied by the original equipment manufacturers as an option, for example) with a removable top cover so as to protect the operator from inclement weather conditions. It is towards providing such a top cover that the present invention is directed.

According to the present invention, a top cover assembly for ATV's is provided which does not necessarily require a rigid frame associated with a front windscreen in order to properly maintain the top in an erected condition and/or to provide support for the top. Instead, the top of this invention maintains tension on the fabric top component via a pair of upright support bows positioned near a rear end of the vehicle. These upright support bows will, in use, flex towards one another when the top is installed. The tendency of these upright support bows to return to their normal condition (i.e., their tendency to flex outwardly from one another) thereby serves to maintain tension of the fabric top component without the need for any forward support (as is usually required for conventional convertible tops).

A front windscreen may also be provided by a transparent resin film which hangs from the forward edge of the fabric top component. Thus, the removable top assembly of this invention may nonetheless be provided with an integral windscreen even though the top component does not itself necessarily depend upon any rigid windscreen frame associated with the vehicle for purposes of support.

These, and other, objects and advantages of the present invention will become more clear after careful consideration is given to the following detailed description of the preferred exemplary embodiments.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
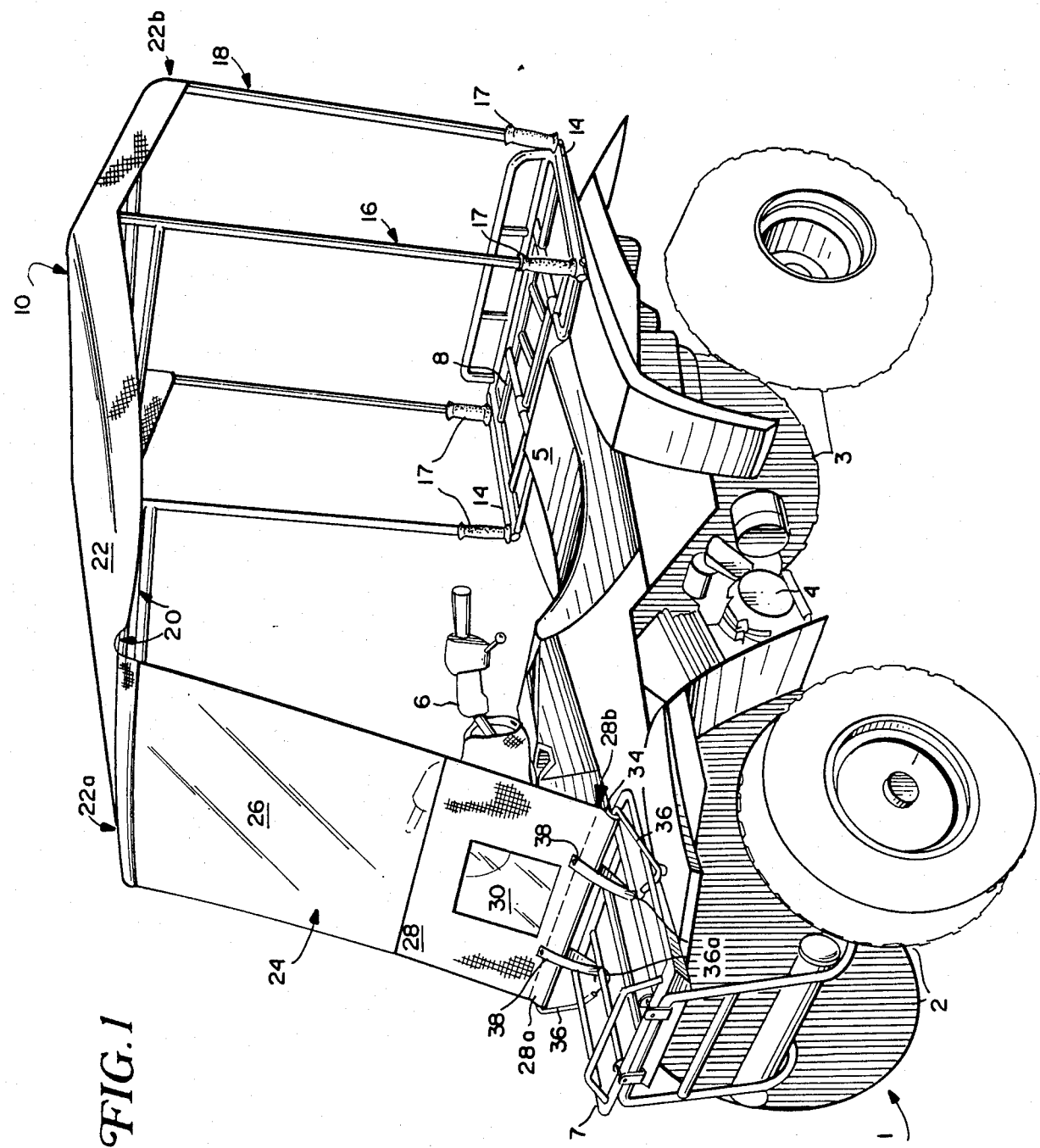
FIG. 1 is a perspective view of an all-terrain vehicle showing the removable top assembly of this invention in operative association therewith.

An all-terrain vehicle (ATV) 1 is shown in accompanying FIG. 1 as having a preferred removable top assembly 10 according to the present invention installed thereupon. The ATV 1 depicted in FIG. 1 is of the conventional type in that it is, in essence, a four-wheeled version of a motorcycle. That is, the ATV 1 includes front and rear pairs of wheels 2, 3, respectively, a mid-mounted engine 4 which drives the rear pair of wheels 3, a saddle-type seat 5 for supporting the operator above the engine 4, and a handle bar assembly 6 which is operatively coupled to, and serves to steer, the front pair of wheels 2 in addition to having the throttle, clutch and/or brake controls in positions conventional to motorcycles. The ATV 1 also includes front and rear equipment-carrying racks 7 and 8, respectively.

Figure 2:
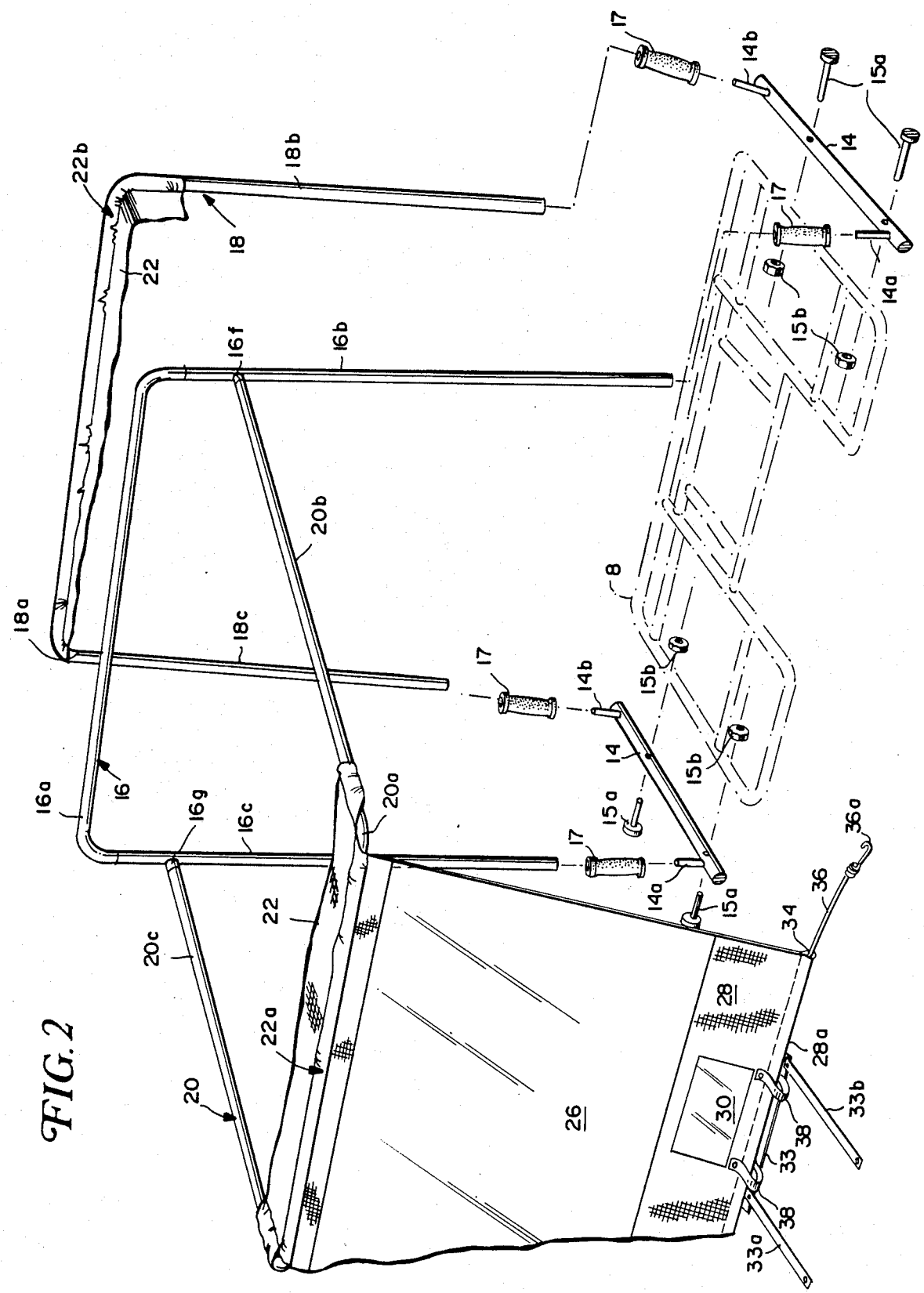
FIG. 2 is a a perspective exploded view showing the components of the removable top assembly according to this invention.

The individual components of the removable top assembly 10 of this invention are shown more clearly in accompanying FIG. 2. As is seen, the top assembly 10 generally includes a pair of lateral upright supports 14 rigidly affixed to a respective lateral side of the rear equipment-carrying rack 8 of the ATV 1 (e.g., by means of bolts and nuts 15a, 15b, respectively). Forward and rearward upright support bows 16, 18, respectively, are mounted to the forward and rearward upright support posts 14a and 14b of each lateral upright support 14, respectively, so as to transversely span the rearward end of the ATV 1. A forwardly projecting generally U-shaped and horizontally disposed support bow 20 is coupled at its rearward end to the upright support bow 16 (as will be described in greater detail below).

Hand grip members 17 formed of a suitable elastomeric material preferably cover each of the upright support posts 14a and 14b. Moreover, it will be observed that the forward upright support posts 14a are substantially vertical, whereas the rearward upright support posts 14b are rearwardly inclined, the purpose of which will be described in greater detail below.

A fabric cover component 22 is fixed at its forward end 22a to the forwardmost extent of the support bow 20, and is fixed at its rear end 22b to the uppermost extent of the support bow 18. The fabric cover component 22 may be formed of any suitable material (e.g., canvas) and is preferably treated so as to provide weather-resistance. It will further be observed that the fabric cover component 22 is connected only to the support bows 18 and 20, and is physically unconnected to the support bow 16 (although the support bow 16 does provide a frame against which a region of the fabric cover component 22 between its forward and rearward edges 22a and 22b, respectively, is supported).

The top assembly 10 also preferably includes a front windscreen portion 24 comprised of a transparent resin film windscreen 26 integrally attached at its upper edge to the forward edge 22a of the fabric cover component 22 so as to be dependently supported thereby.

A lower fabric segment 28 is integrally connected to the windscreen 26 below the normal field of vision for the ATV operator. The lower fabric segment defines a window 30 which is preferably covered by a transparent resin film similar to the windscreen 26 to allow the light beam from the ATV headlight (not shown in FIG. 1, but see reference numeral 32 in FIG. 7) to forwardly project therethrough. The transparent window 30 may be covered by a headlight shroud (a portion of which is shown in FIG. 2 by reference numeral 33) when not in use. The shroud 33 includes a pair of strap connectors 33a, 33b which allow the shroud 33 to be draped over, and fastened around, the headlight 32 when desired.

A transverse loop 28a is formed at the bottom end 28b of the fabric segment 28 so as to receive a rod 34 therethrough. An elastic cord 36 is positioned within the rod 34 and is of sufficient length such that its opposing terminal ends extend therefrom. These terminal ends of cord 36 are preferably provided with hooks 36a for securing the rod 34 (and hence the bottom of the windscreen 24) to the forward equipment-carrying rack 7 of the ATV 1 (see FIG. 1). Additional stability to the front windscreen 24 is provided by coupling the hooks 36a into a respective one of the windscreen mounting loops 38 associated with the fabric segment 28.

Figure 3:
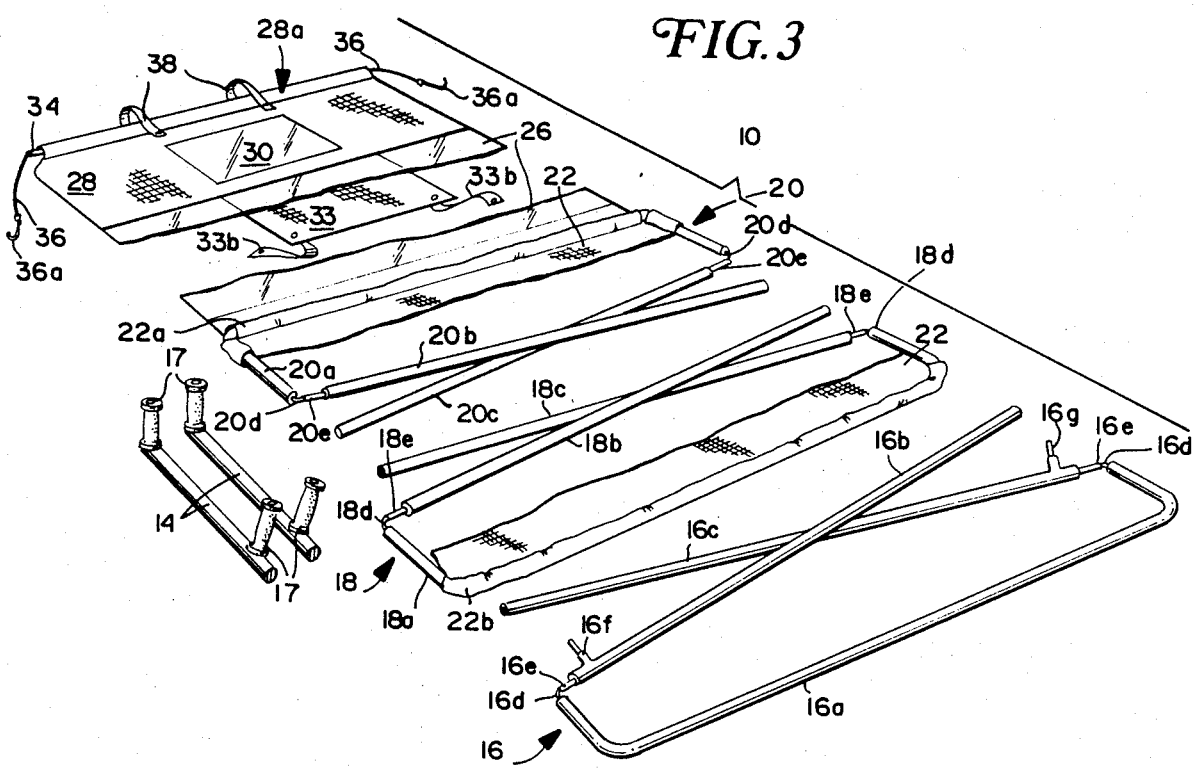
FIG. 3 is a perspective view showing the individual components of a kit according to this invention which provides the removable top assembly shown in FIG. 2.

FIG. 3 shows the components of the top assembly 10 of this invention in a disassembled and collapsed state. As is seen, the support bows 16, 18 and 20 are each tubular in configuration and are provided with a shallow U-shaped rod segment 16a, 18a, and 20a and a pair of elongate rod segments 16a and 16b, 18a and 18b, and 20a and 20b, respectively.

Referring specifically to support bow 16 shown in FIG. 3, it is seen that the ends of elongate rods 16a and 16b are each connected to a respective end of U-shaped rod 16a via flexible elastic cords 16d. These cords 16d permit the elongate rods 16b, 16c to be folded onto the U-shaped rod 16a so as to facilitate storage and/or transport of the individual top components during periods of nonuse. Moreover, it will be observed that the ends of elongate rods 16b, 16c adjacent the ends of the U-shaped rod 16a are provided with a terminal section 16e of reduced diameter. When erected, therefore, the sections 16e are thus adapted to being inserted within the tubular end portions of the U-shaped rod 16a (see FIG. 2). The upright support posts 14a and 14b of each of the lateral supports 14 are likewise of reduced diameter. Thus, support posts 14a are adapted to being inserted into the lowermost ends (i.e., the ends opposite the reduced diameter sections 16e) of the elongate rods 16a, 16b.

Similar to the structures described above, the support bows 18 and 20 each respectively include a shallow U-shaped rod segment 18a and 20a; a pair of elongate rod segments 18b, 18c and 20b, 20c; reduced diameter sections 18e and 20e on the ends of rods 18b, 18c and 20b, 20c; and elastic cords 18d, 20d joining each of the elongate rods 18b, 18c and 20b, 20c to the shallow U-shaped rod 18a, 20a. Since the upright support posts 14b are of reduced diameter, they may be inserted into the elongate support rods 18b, 18c in a manner similar to the interconnection between the support posts 14a and the support rods 16b, 16c described above.

The support bow 16, unlike the support bows 18 and 20, also includes nibs 16f and 16g which are positioned near an upper end of, and project outwardly from, the elongate rods 16b and 16c, respectively. These nibs 16f, 16g are each of reduced diameter and are adapted for being inserted into a respective one of the terminal ends of elongate support rods 20b and 20c of the horizontal support bow 20 when the top 10 of this invention is erected (see FIG. 2).

Figure 4:
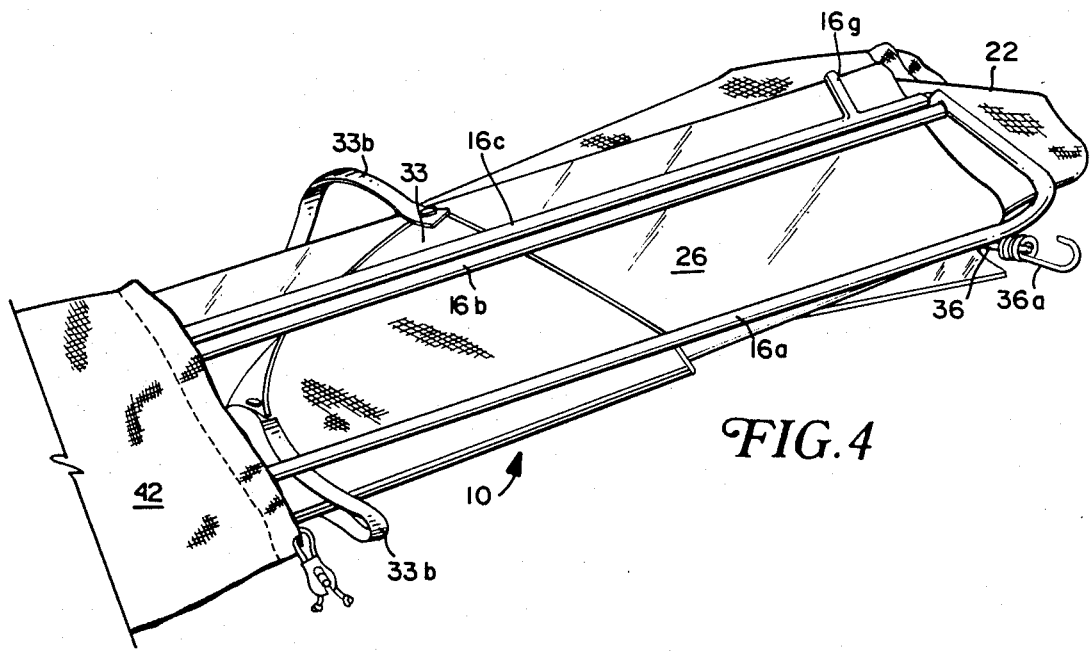
FIG. 4 is a perspective view showing the manner in which the individual kit components depicted in FIG. 3 may be stored and/or transported when disassembled.

The individual components for the top 10 which have been described above with reference to FIG. 3, may be collapsed and stored in kit form within a suitable open-ended sack 42 as is shown in accompanying FIG. 4. It will be understood that only a few of the individual components of the top assembly 10 are visible in FIG. 4, the other components described above being present, but hidden.

To erect the top assembly of the present invention, the lateral upright supports 14 are first affixed to a rear portion of the ATV 1—preferably to the rear equipment-carrying rack 8 as is shown in FIG. 1—via the bolt and nut assemblies 15a, 15b, respectively. The support bows 16, 18 and 20 may then be readied by coupling the elongate support rods 16b and 16c, 18b and 18c, and 20b and 20c, to their respective shallow U-shaped rods 16a, 18a and 20a. The lowermost ends of the support rods 16b, 16c and 18b, 18c may then be coupled to the upright support posts 14a and 14b, respectively, so that each of the support bows 16 and 18 are transversely disposed relative to the ATV 1. It will be noted here that the elongate rods 16b, 16c of the support bow 16 are coupled to the upright support posts 14a so that the nibs 16f, 16g thereof project forwardly relative to the ATV 1.

With the support bows 16 and 18 coupled to the lateral upright supports 14 as described above, the fabric top component 22 may then be draped over the support bow 18, it being understood that the rear end 22b of the fabric top component 22 is physically attached to the shallow U-shaped rod 18a of bow 18. The lowermost ends of the elongate rods 22b, 22c of the support bow 20 may then temporarily be positioned against the nibs 16f, 16g, respectively, of the support bow 16. This condition is shown in accompanying FIG. 5. It will also be observed that the support bow 16 is substantially vertical (i.e., since the upright support posts 14a to which it is coupled are substantially vertical), whereas the support bow 18 is rearwardly inclined (i.e., since the upright support posts 14b to which it is coupled are similarly rearwardly inclined).

To complete the erection of the top assembly 10, the forwardmost extent of the support bow 20 (i.e., at the fabric component forward end 22b) need only be pivoted downwardly against the nibs 16f, 16g, until the support rods 20b, 20c are coaxially aligned with the nibs 16f, 16g, respectively, whereby the latter may be inserted into the former. The installed top assembly 10 of this invention is shown in accompanying FIG. 6.

Removal of the top assembly proceeds in a manner opposite to the sequence described above, with the exception being there is no need to physically uncouple the lateral upright supports 14 from the equipment-carrying rack 8. That is, the supports 14 may remain rigidly affixed to the rack 8 and thus be present to facilitate erection of the top assembly 10 at another time.

Figure 6:
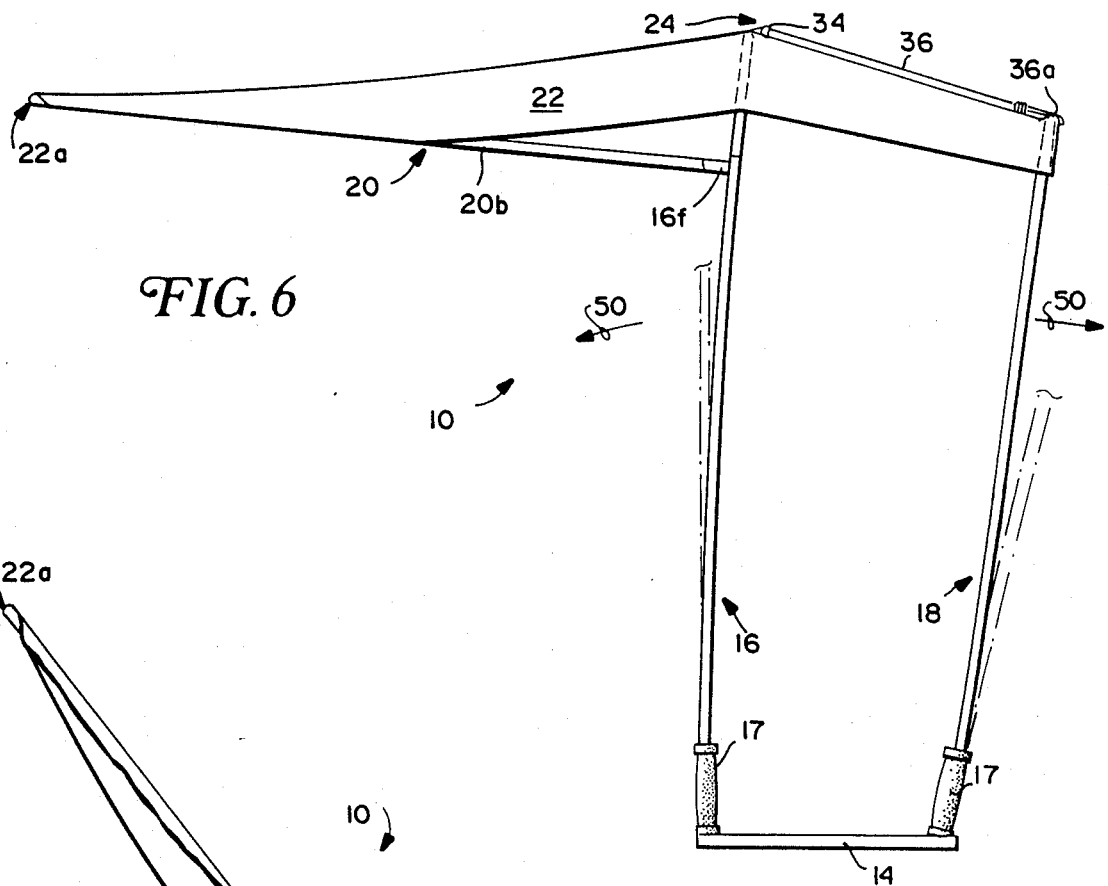
FIG. 6 is a side elevational view showing the removable top of this invention in its erected condition.

The dimension of the fabric top component 20 is such that the support bows 16 and 18 are inwardly flexed toward one another when the top assembly 10 is erected—that is, as shown by the solid lines in accompanying FIG. 6. The support bows 16 and 18 will thus tend to outwardly separate (i.e., generally in the direction of arrows 50 in FIG. 6) and it is this tendency which exerts a desirable tension force on the fabric top component 22 between its ends 22a and 22b so as to maintain the same in a taunt condition. The tension force is further facilitated due to the upright support posts 14b (and hence the upright support bow 18) being rearwardly inclined. Moreover, this tension force actually assists in the assembly of the top 10. That is, when the forward end of the support bow is downwardly pivoted (arrow 52 in FIG. 5), the tension force will assist in the coupling of the support rods 20b, 20c onto the nibs 16f, 16g, respectively, when such structures come into coaxial alignment with one another.

Figure 5:
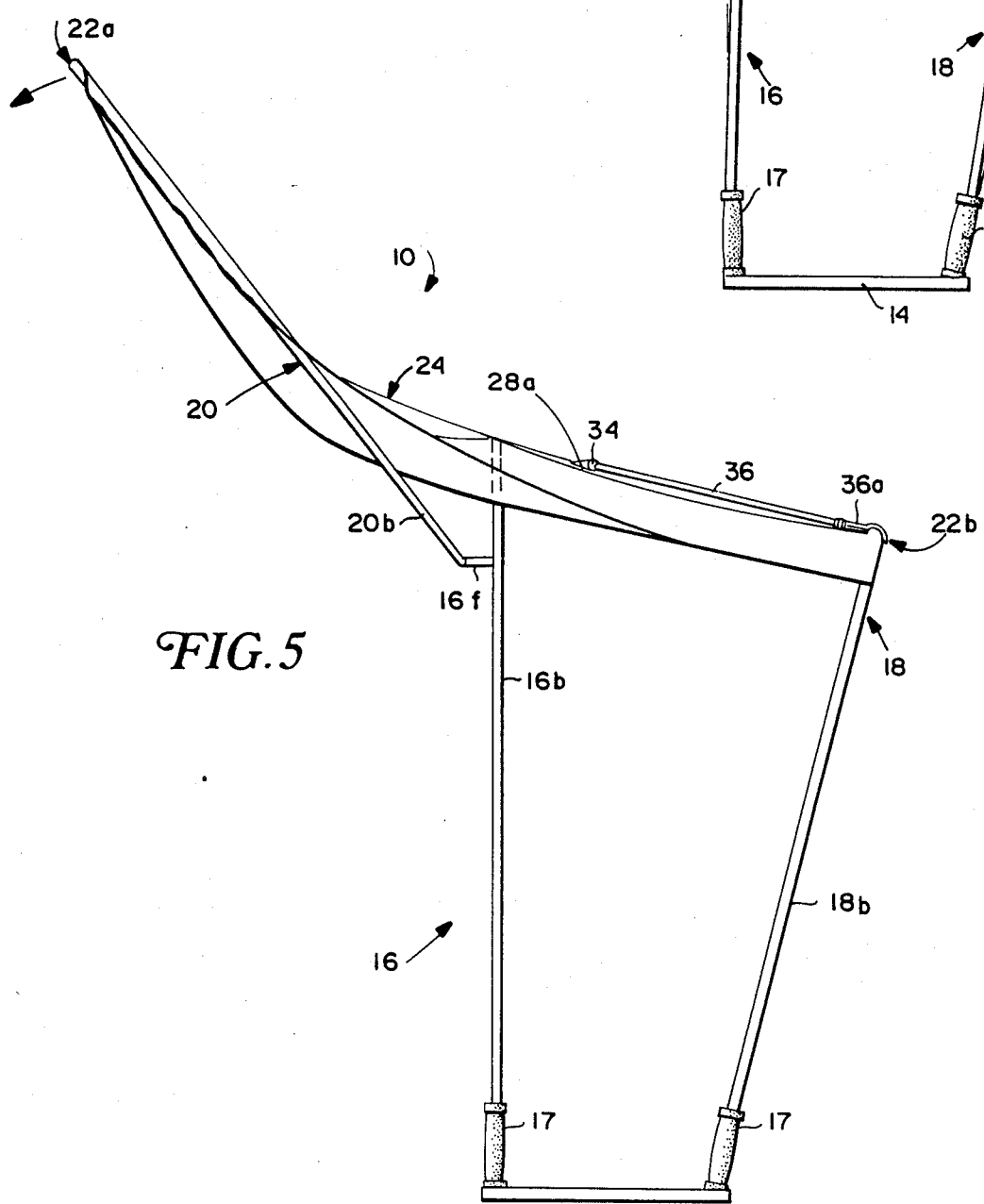
FIG. 5 is a side elevational view showing an intermediate condition of the removable top during assembly.

As will be appreciated, the tension force provided by the inwardly flexed support bows 16, 18, enables the top assembly 10 to be maintained in its erected state without need of being coupled to a rigid window frame or the like associated with the ATV 1. As such, the windscreen 24 may be draped on top of the fabric top component 22 when the presence of the windscreen is not desired. In such a situation, the windscreen 24 may be maintained in that condition simply by coupling the hook members 36a to the support bow 18 as is shown in FIGS. 5 and 6. However, when it is desired to position the windscreen 24 forwardly of the ATV operator, the hooks 36a may simply be uncoupled from the support bow 18 so that the windscreen hangs by its own weight from the forward edge 22a of the fabric top component (i.e., from the U-shaped support rod 20a of support bow 20 as shown in FIG. 1). To keep the windscreen 24 from freely moving, the hook members 36a may then be reattached to the front equipment-carrying rack 7 and the forward loops 38 as previously described.

Figure 7:
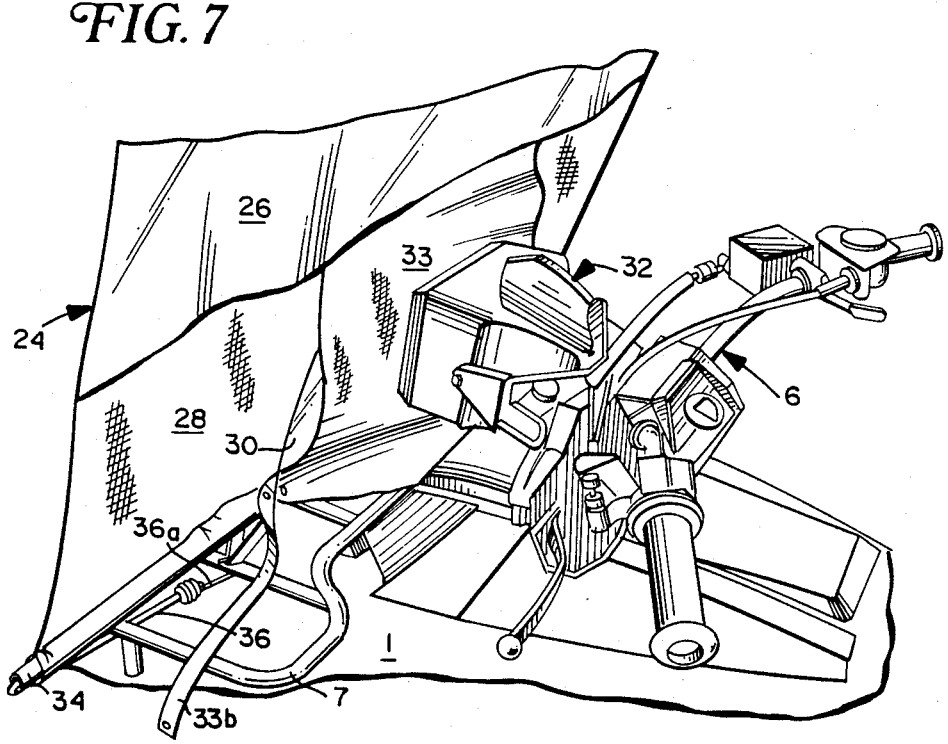
FIG. 7 is a perspective interior of the ATV operator's compartment particularly showing the headlight shroud of the removable top in an inoperative condition.
Figure 8:
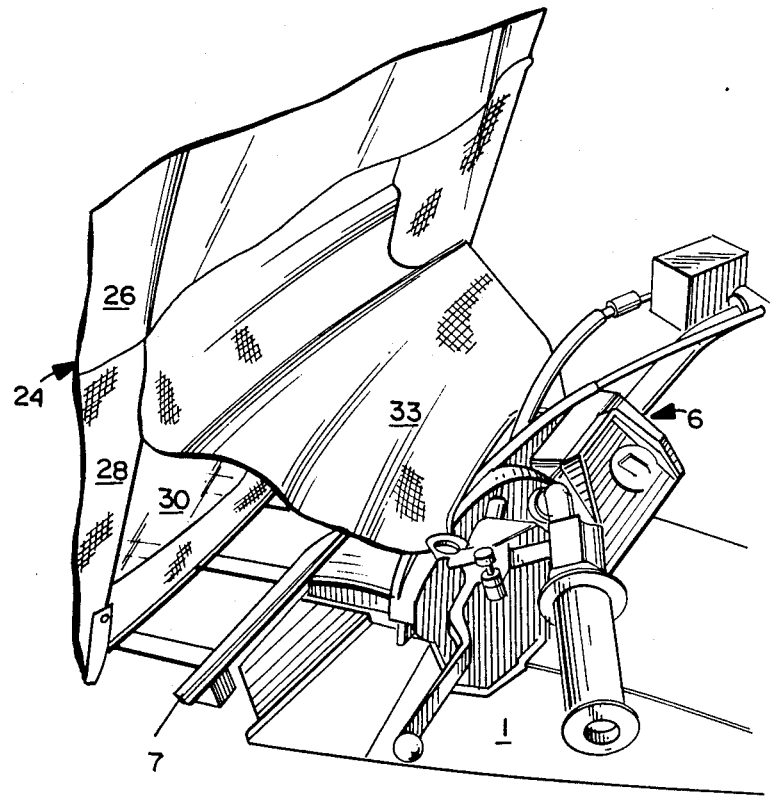
FIG. 8 is a perspective view similar to FIG. 7 but showing the headlight shroud in an operative condition.

Accompanying FIGS. 7 and 8 show the manner in which the headlight shroud 33 may be used. As is seen in FIG. 7, the shroud 33 is positioned in front of the headlight 32 of the ATV 1. In such a manner, the beam from the headlight 32 is prevented from passing through the transparent window 30. Instead, the beam (if the headlight 52 is on) is reflected by the shroud 33 so as to illuminate the interior operator's region. When it is desired to allow the beam of the headlight 32 to project forwardly of the ATV 1 (e.g., when it is desired to operate the ATV 1 during decreased visibility conditions), the shroud 33 may then simply be draped over the headlight 32 as is shown in FIG. 8. The shroud 33 is maintained in such a position by encircling the lower portion of the headlight 32 with the straps 33b and then connecting the ends of straps 33b one to another via any suitable connector means (e.g., two part snaps, buttons, Velcro ® loop and pile fasteners, and the like) associated with each end of the straps 33b.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A kit which provides a removable top assembly for a vehicle comprising the following components:
   a pair of lateral upright support members adapted to being rigidly coupled to a rearward portion of the vehicle, each said lateral upright support member having forward and rearward upright support posts;
   a first support bow including a first generally U-shaped support rod, and a pair of first elongate support rods each having an upper end adapted to being removably connected to a respective end of said first U-shaped support rod and a lower end adapted to being removably connected to a respective one of said forward upright support posts;
   each of said first elongate support rods of said first support bow including a nib which projects outwardly therefrom;
   a second support bow including a second generally U-shaped support rod, and a pair of second elongate support rods each having an upper end adapted to being removably connected to a respective end of said second U-shaped support rod and a lower end adapted to being removably connected to a respective one of said rearward upright support posts;
   a third support bow including a third generally U-shaped support rod, and a pair of third elongate support rods each having an front end adapted to being removably connected to a respective end of said third U-shaped support rod and rear end adapted to being removably connected to a respective one of said nibs of said first elongate support rods; and
   a fabric cover component having a forward edge attached to said third U-shaped support rod, and a rearward edge attached to said second U-shaped support rod.

2. A kit as in claim 1, wherein at least one of said first, second and third support bows includes flexible cord means for providing flexible interconnection between at least one of said first, second and third elongate support rods and said respective ends of at least one of said U-shaped support support rods, so as to allow said one of said first, second and third elongate support rods to be foldable onto said at least one of said first, second and third U-shaped support rods, respectively.

3. A kit as in claim 1 or 2, further comprising a windscreen having an upper edge integrally attached to said forward edge of said fabric top component.

4. A kit as in claim 3, wherein said windscreen includes an upper transparent windscreen portion and a lower fabric portion, said lower fabric portion including a transparent window in substantial alignment with a headlight of said vehicle.

5. A kit as in claim 4, wherein said windscreen further includes a headlight shroud which covers said window when in a first position, and is adapted to being draped over the vehicle's headlight when in a second position.

6. A kit as in claim 4, wherein said lower fabric portion includes a bottom loop portion, a transverse rod received in said loop portion, and an elastic cord received in said transverse rod, said cord having opposing terminal ends, each of which includes a hook member adapted to being connected to a forward portion of the vehicle and thus provide positional stability to said windscreen.

7. A kit as in claim 1, wherein said forward upright support posts are substantially vertically oriented, and said rearward upright support posts are rearwardly inclined relative to said forward upright support posts.

8. A kit as in claim 1, further including means adapted to rigidly affix said lateral upright supports to said rearward portion of the vehicle.

9. A kit as in claim 1, further comprising an open-ended bag sized and configured to receive said components when disassembled.

10. A removable vehicle top comprising:
a pair of lateral upright supports adapted to being rigidly fixed to a rear portion of the vehicle;
forward and rearward generally U-shaped upright support bows adapted to being removably coupled to said pair of lateral supports so that said forward and rearward support bows are generally transversely oriented with respect to the rear portion of the vehicle;
a forwardly extending horizontal support bow adapted to being removably coupled to an upper region of said forward upright support bow;
a fabric top component having a forward edge connected to a forwardmost extent of said horizontal support bow, and a rearward edge connected to an uppermost extent of said rearward support bow, said fabric top component adapted to being supported by an uppermost extent of said forward support bow along a region between said forward and rearward edges thereof when said vehicle top is erected;
said forward and rearward upright support bows being inwardly flexed relative to one another when said vehicle top is erected so as to provide means for exerting a tension force on said fabric top component between said forward and rearward edges thereof, whereby said fabric top component is maintained in a taunt condition.

11. A vehicle top as in claim 10, wherein said forward and rearward support bows and said horizontal support bows each include a generally U-shaped support rod, a pair of elongate support rods, and means for removably coupling one end of each said elongate support rod to a respective end of an associated one of said generally U-shaped support rods.

12. A vehicle top as in claim 11, wherein each of said elongate support rods includes flexible cord means which flexibly interconnects said one end thereof to said respective end of said associated generally U-shaped support rod, said cord means for allowing said elongate support rods to remain connected to, yet be folded onto, said associated generally U-shaped support rod when disassembled therefrom.

13. A vehicle top as in claim 12, wherein said cord means include elastic cords.

14. A vehicle top as in claim 10, further comprising a windscreen having an upper edge integrally attached to said forward edge of said fabric top component.

15. A vehicle top as in claim 14, wherein said windscreen includes an upper transparent windscreen portion and a lower fabric portion, said lower fabric portion including a transparent window in substantial alignment with a headlight of said vehicle.

16. A vehicle top as in claim 15, wherein said windscreen further includes a headlight shroud which covers said window when in a first position, and is adapted to being draped over the vehicle's headlight when in a second position.

17. A vehicle top as in claim 15, wherein said lower fabric portion includes a bottom loop portion, a transverse rod received in said loop portion, and an elastic cord received in said transverse rod, said cord having opposing terminal ends, each of which includes a hook member adapted to being connected to a forward portion of the vehicle and thus provide positional stability to said windscreen.

18. A vehicle top as in claim 10, wherein each of said lateral upright supports includes a forward upright support post and a rearward upright support post, said forward upright support post being substantially vertically oriented, and said rearward upright support post being rearwardly inclined relative to said forward upright support post.

19. A vehicle top as in claim 10, further including means adapted to rigidly affix said lateral upright supports to said rearward portion of the vehicle.

20. A vehicle top as in claim 10, further comprising an open ended bag sized and configured to receive said top components when disassembled and removed from the vehicle.

21. The combination comprising:
an all-terrain vehicle which includes forward and rearward pairs of wheels, an engine mounted substantially midway between said forward and rearward pairs of wheels and providing driven power to at least one of said forward and rearward pairs of wheels, a saddle seat for a vehicle operator extending above said engine, handlebar means coupled to said forward pair of wheels for steering the vehicle, and a removable top assembly, said removable top assembly including:
(i) a pair of lateral upright supports rigidly fixed to a rear portion of the vehicle;
(ii) forward and rearward generally U-shaped upright support bows removably coupled to said pair of lateral supports so that said forward and rearward support bows are generally transversely oriented with respect to the rear portion of the vehicle;
(iii) a forwardly extending horizontal support bow removably coupled to an upper region of said forward upright support bow;
(iv) a fabric top component having a forward edge connected to a forwardmost extent of said horizontal support bow, and a rearward end connected to an uppermost extent of said rearward support bow, and being supported by an uppermost extent of said forward support bow along a region between said forward and rearward edges thereof;
(v) said forward and rearward upright support bows being inwardly flexed relative to one another so as to provide means for exerting a tension force on said fabric top component between said forward and rearward edges thereof, whereby said fabric top component is maintained in a taunt condition.

22. The combination as in claim 21, wherein said forward and rearward support bows and said horizontal support bows each include a generally U-shaped support rod, a pair of elongate support rods, and means for removably coupling one end of each said elongate support rod to a respective end of an associated one of said generally U-shaped support rods.

23. The combination as in claim 22, wherein each of said elongate support rods includes flexible cord means which flexibly interconnects said one end thereof to said respective end of said associated generally U-shaped support rod, said cord means for allowing said elongate support rods to remain connected to, yet be folded onto, said associated generally U-shaped support rod when disassembled therefrom.

24. The combination as in claim 23, wherein said cord means include elastic cords.

25. The combination as in claim 21, further comprising a windscreen having an upper edge integrally attached to said forward edge of said fabric top component.

26. The combination as in claim 25, wherein said vehicle includes a headlight, and wherein said windscreen includes an upper transparent vehicle windscreen portion and a lower fabric portion, said lower fabric portion including a transparent window in substantial alignment with the headlight of said vehicle.

27. The combination as in claim 26, wherein said windscreen further includes a headlight shroud which covers said window when in a first position, and is adapted to being draped over the vehicle's headlight when in a second position.

28. The combination as in claim 26, wherein said lower fabric portion includes a bottom loop portion, a transverse rod received in said loop portion, and an elastic cord received in said transverse rod, said cord having opposing terminal ends each of which includes a hook member adapted to being connected to a forward portion of the vehicle and thus provide positional stability to said windscreen.

29. The combination as in claim 21, wherein each of said lateral upright supports includes a forward upright support post and a rearward upright support post, said forward upright support post being substantially vertically oriented, and said rearward upright support post being rearwardly inclined relative to said forward upright support post.

* * * * *